No. 746,208. PATENTED DEC. 8, 1903.
T. S. WAGONER.
ROTARY HARROW.
APPLICATION FILED JULY 31, 1903.
NO MODEL. 2 SHEETS—SHEET 1.
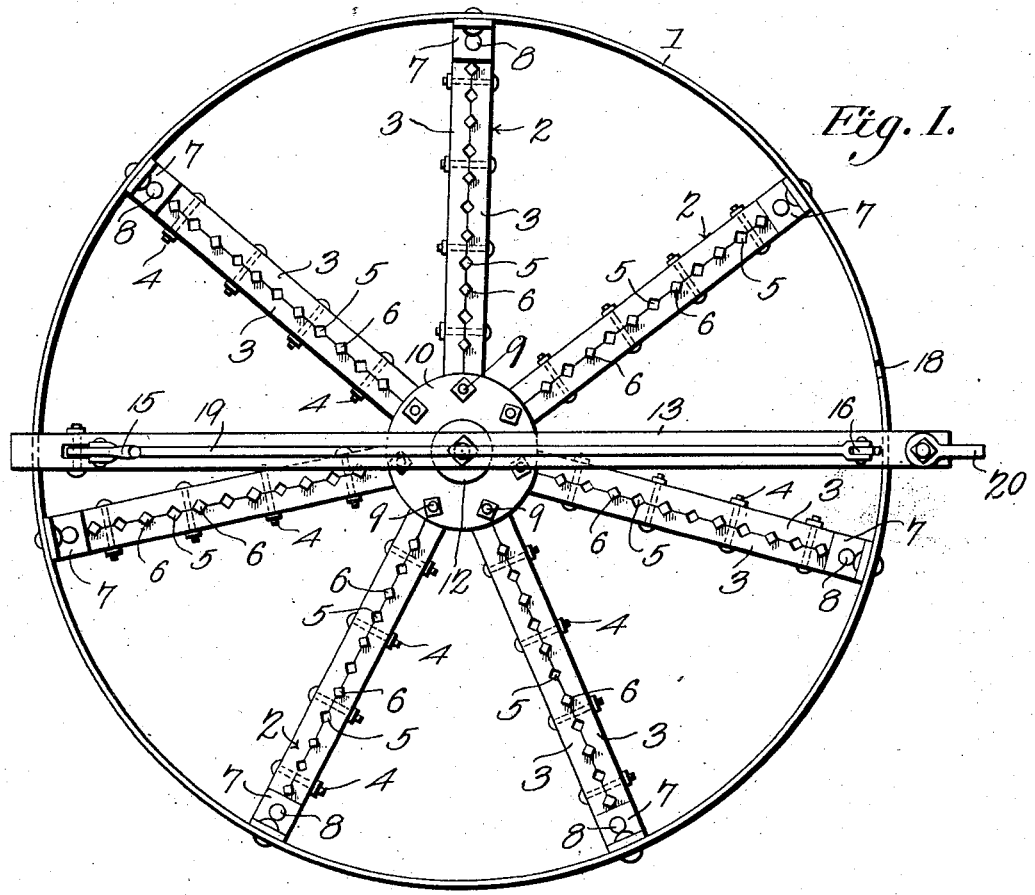
Fig. 1.
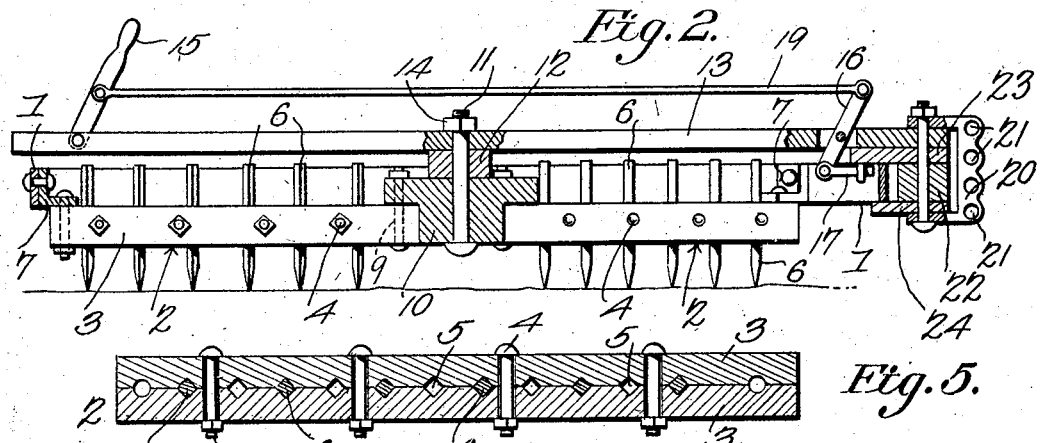
Fig. 2.
Fig. 5.
Witnesses
Thomas S. Wagoner, Inventor.
by
Attorneys No. 746,208. PATENTED DEC. 8, 1903.
T. S. WAGONER.
ROTARY HARROW.
APPLICATION FILED JULY 31, 1903.
NO MODEL. 2 SHEETS—SHEET 2.
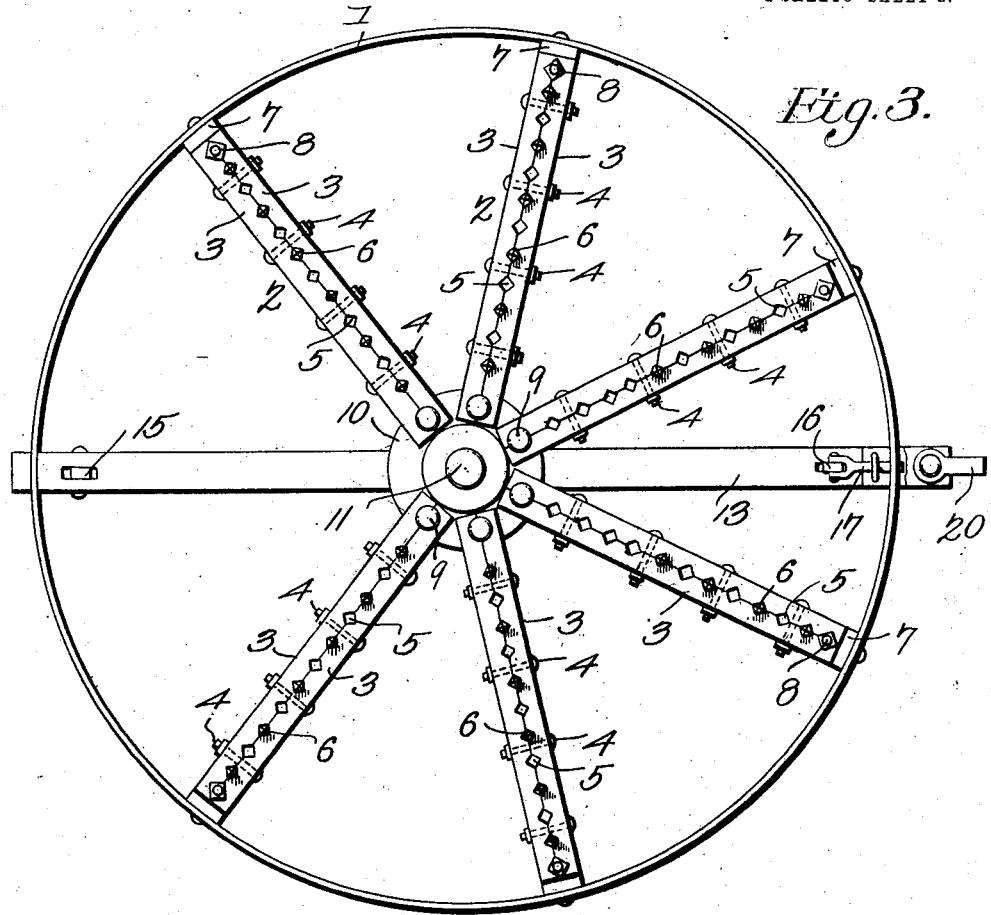
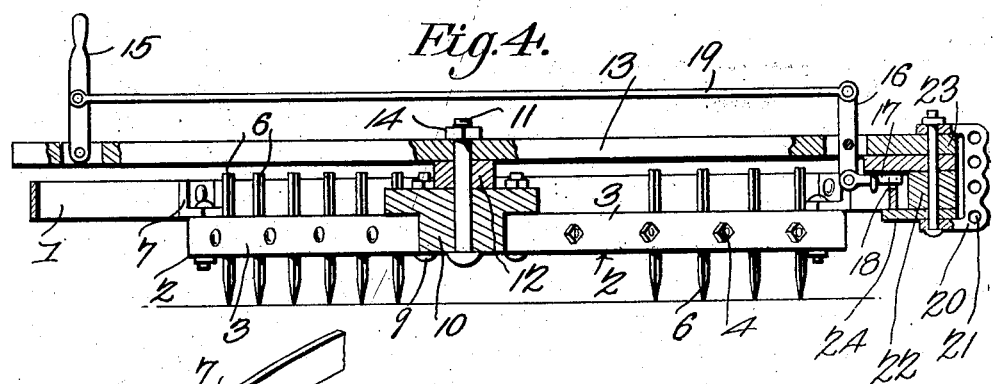
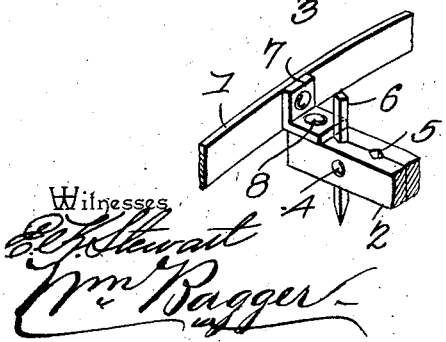
Witnesses Thomas S. Wagoner, Inventor.
by C. A. Snow & Co.
Attorneys No. 746,208. Patented December 8, 1903.

UNITED STATES PATENT OFFICE.

THOMAS S. WAGONER, OF LOOGOOTEE, INDIANA, ASSIGNOR OF ONE-HALF TO JAMES A. THOMPSON, OF LOOGOOTEE, INDIANA.

ROTARY HARROW.

SPECIFICATION forming part of Letters Patent No. 746,208, dated December 8, 1903.

Application filed July 31, 1903. Serial No. 167,783. (No model.)

*To all whom it may concern:*

Be it known that I, THOMAS S. WAGONER, a citizen of the United States, residing at Loogootee, in the county of Martin and State of Indiana, have invented a new and useful Rotary Harrow, of which the following is a specification.

This invention relates to rotary harrows; and it has for its object to provide a device of this class which shall possess superior advantages in point of simplicity, durability, and general efficiency; which may be conveniently and successfully operated upon any kind of soil, and which when it is desired to cultivate plants growing in rows, such as corn, may be utilized for this purpose without danger of injuring the young plants by slightly modifying the structure and locking the rotary tooth-carrying element against rotation.

With these and other ends in view my invention consists in the improved construction, arrangement, and combination of parts, which will be hereinafter fully described, and particularly pointed out in the claims.

In the accompanying drawings I have illustrated a simple and preferred form of my invention, it being understood, however, that I do not limit myself to the precise structural details herein shown and described, but reserve to myself the right to any changes, alterations, and modifications which may be resorted to within the scope of my invention and without departing from the spirit or sacrificing the utility of the same.

In said drawings, Figure 1 is a top plan view of my improved harrow. Fig. 2 is a longitudinal vertical sectional view of the same. Fig. 3 is a bottom plan view showing the harrow locked against rotation and with one of the tooth-bars removed for the purpose of straddling a row. Fig. 4 is a vertical sectional view of the harrow, as shown in Fig. 3. Fig. 5 is a horizontal sectional view taken through one of the tooth-carrying bars. Fig. 6 is a perspective detail view showing the means for connecting one of the tooth-carrying bars with the rim of the rotary element of the harrow.

Corresponding parts in the several figures are indicated by similar numerals of reference.

The rotary element of my improved harrow is composed, primarily, of a rim 1, composed, preferably, of band-iron of suitable dimensions, forming a rim or tire, as will be readily understood. In connection with the rim 1 I use a plurality of radially-disposed tooth-carrying bars 2 2, each of which is composed of a pair of side members 3 3, connected by means of transversely-disposed bolts 4 4. The adjacent or opposing faces of the side members 3 3 are provided each with a plurality of recesses 5 5, those of each side member registering with each other, as will be clearly seen in the several figures of the drawings. These recesses 5 combine to form sockets for the reception of the harrow-teeth 6, of which any desired number may be used in each of the radiating bars. It will be seen that an ample number of sockets are provided to accommodate a large number of teeth; but in many instances a number of the teeth may be removed and the sockets left vacant, thus enabling me to provide my improved harrow with just the number of teeth in each radial bar which shall be deemed desirable or necessary for the work to be performed and also enabling me to arrange the said teeth relatively to each other in any manner that may be deemed suitable and desirable.

The radial tooth-carrying bars 2 are connected at their outer ends with the rim 1 by means of L-shaped brackets 7, the arms of which are connected by means of bolts 8, respectively, to the outer ends of the tooth-carrying bars and to the inner side of the rim. If preferred, rivets may be employed to connect the L-shaped bracket with the rim; but the tooth-carrying bars are to be connected detachably with the brackets. The inner ends of said tooth-carrying bars are likewise connected by means of bolts 9 with a center piece or hub 10, thus enabling any one or more of the said tooth-carrying bars to be removed at pleasure from the harrow structure.

11 designates a bolt constituting a vertical axle, which extends through the center of the hub through a block 12, supported upon the hub, and through a hitching-bar or draft-bar 13, which is supported centrally upon the said block 12 and which is retained in position by means of a nut 14 upon the upper end of the axle-bolt. The draft-bar 13 is provided with a pair of levers 15 and 16 near its rear and front ends, respectively, the lever 15 extending upwardly from the draft-bar, to which it is fulcrumed, and the lever 16 being fulcrumed in a slot of said draft-bar, through which it extends downwardly, and is provided with a catch 17, adapted to engage a notch 18 in the rim of the rotary member of the device for the purpose of locking said rotary member in a stationary position. The levers 15 and 16 are connected by means of a rod 19, enabling the latch mechanism to be operated by means of the handled lever 15, which is conveniently accessible to the driver, who walks behind the machine.

Suitably connected with the front end of the draft or hitching bar 13 is a clevis 20 of ordinary construction, consisting of a vertically-disposed yoke, the forward portion of which is provided with a plurality of perforations 21 for the adjustment of the draft. Between the arms of the yoke constituting the clevis are placed a filling-block 22 and a pair of guide-plates 23 and 24, said guide-plates being spaced apart by the filling-block 22, so as to engage the upper and under edges of the tire 1 of the rotary member of the device.

When my improved device is to be utilized as a rotary harrow, the latching mechanism is of course disengaged from the rim of the rotary member, draft being applied at the front end of the hitching-bar, and the machine being dragged over the ground the rotary toothed member will revolve upon its axis, thus thoroughly stirring and cultivating the soil which is exposed to the operation of the harrow.

A great advantage of the device is this, that when the teeth of the harrow, after the rotary member has been revolving for some time in one direction, accumulate roots and trash which hinder their progress the rotary member will automatically be brought to a stop, owing to the impediment offered by the obobstructions adhering to the harrow-teeth, and will then resume rotation in an opposite direction, thus causing the harrow-teeth to clear themselves of any of the obstructions and impediments adhering thereto. My improved harrow is thus self-cleaning and requires little attention on the part of the operator. It is obvious that, as before stated, prior to the beginning of operation the teeth will be placed in the tooth-holding bars in any desired number and relative locations.

Should it be desired to utilize the harrow for cultivating purposes upon a row of growing plants, it is only necessary to cause the latch mechanism to engage the notch in the rim of the rotary element, thus preventing said element from rotating. This notch is disposed between the attached ends of two of the radially-disposed tooth-carrying bars, and this will, under the construction illustrated in the annexed drawings, bring one of the tooth-carrying bars (of which seven have been shown) in direct alinement with the hitching-bar. This tooth-carrying bar, the presence of which would prove fatal to the operation of the device, is simply removed, and the device will thus be enabled to straddle the row of plants, three tooth-carrying bars being disposed on either side of the row.

Those who are familiar with devices of this class will readily understand the uses and capabilities of my invention and will be readily able to so dispose and transfer the various component parts as to enable them to achieve the most beneficial results.

The device taken as a whole is simple, inexpensive, and may be conveniently operated with the most useful results.

Having thus described my invention, I claim—

1. In a rotary harrow, a rim, a hub, L-shaped brackets secured to the inside of the rim, and tooth-carrying bars connected detachably with said brackets and with the hub.

2. In a rotary harrow, a rim, a hub, L-shaped brackets secured upon the inner side of the rim, tooth-carrying bars detachably connected with said brackets and with the hub, an axle extending vertically through the hub, a draft-bar mounted upon said axle, levers connected pivotally with the draft-bar, a rod connecting said levers, and latch mechanism operated by one of said levers to engage the rotary member of the device.

3. In a rotary harrow, the combination with a rotary element having radially-disposed detachable tooth-carrying bars, a vertical axle, a draft-bar mounted upon said axle, draft-attaching means at the front end of said bar, bearing-plates and spacing means connected with said draft-attaching means, said bearing-plates engaging the upper and lower edges of the rotary element, and means for locking the latter in a stationary position with relation to the draft-bar.

In testimony that I claim the foregoing as my own I have hereto affixed my signature in the presence of two witnesses.

THOMAS S. WAGONER.

Witnesses:
WARREN SUMMERS,
F. S. SMITH.